S. B. GILLILAND.
Horse Hay Rake.

No. 235,227. Patented Dec. 7, 1880.

Witnesses:

Inventor:
Samuel B. Gilliland

UNITED STATES PATENT OFFICE.

SAMUEL B. GILLILAND, OF SALISBURY, MISSOURI.

HORSE HAY-RAKE.

SPECIFICATION forming part of Letters Patent No. 235,227, dated December 7, 1880.

Application filed February 21, 1880.

*To all whom it may concern:*

Be it known that I, SAMUEL B. GILLILAND, of Salisbury, Chariton county, in the State of Missouri, have invented a new and useful Improvement in Hay-Rakes or Hay-Gatherers, of which the following is a specification.

My invention relates to an improvement in horse hay-rakes; and it consists in the tongue-frame B, wheel-supported tongue C, rollers G, in connection with rake A, and in the combination and arrangement thereof, as hereinafter more fully specified.

Figure 1:
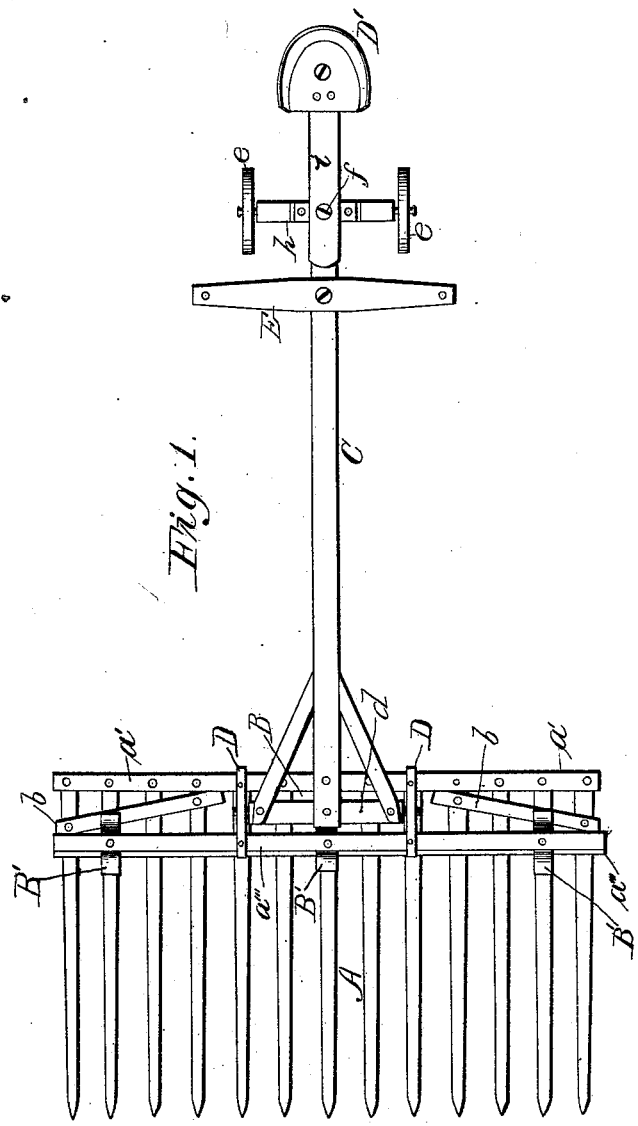
Figure 2:
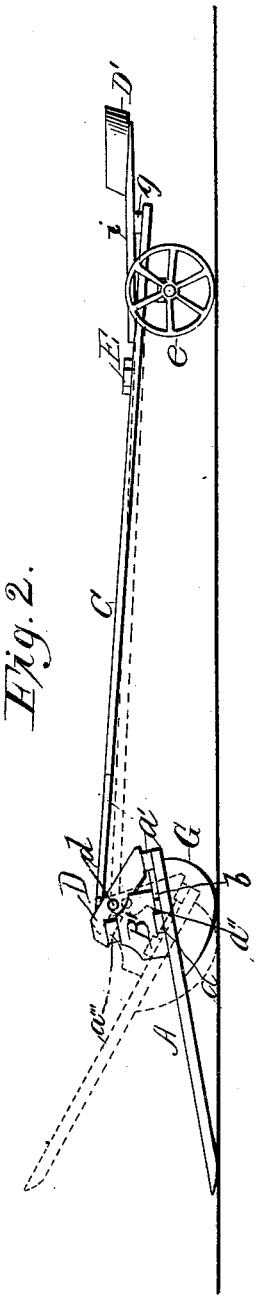

In the drawings, Figure 1 is a plan view of my improvement, and Fig. 2 is a side elevation thereof.

A marks the prongs of my rake, which are connected and framed together by the transverse bars $a$ and $a'$ and the oblique bars $b\ b$.

B' B' mark standards or supports, shouldered at $a''$ to form a recess for reception of bars $a$ and $b$. These standards or supports are rigidly secured by ordinary means to fork A and to the said transverse bars, and furnish bearings for the transverse bar $a'''$, which is rigidly secured to it at top thereof, and serves as a fender to prevent the hay from being pushed back over the rake.

The inclined bars D D are shouldered at top for admission of transverse bar $a'''$, and are bolted at top and bottom to the transverse bars $a'''$ and $a'$. These inclined bars are designed to furnish bearings for the pivoted bar $d$, which comprises a part of the rake-tongue.

The tongue C is connected to the axle of the vehicle-wheels $e\ e$ by the bolt $f$ a short distance in rear of the whiffletree E. Connected therewith and projecting rearward therefrom is the beam $i$, which is slightly elevated by the wedge $g$, which latter is designed to project the driver slightly forward. It is bolted to the axle $h$, and the seat of the driver, D', which is secured to the rear end thereof, is located at a proper distance from the axle to enable the driver to rest his feet thereon, and by pressure of his feet upon the axle give direction to the vehicle. By thus operating the device the two draft-animals ordinarily employed require but one instead of two drivers, as formerly.

The rollers or rockers G G are constructed in form of a segment of a circle, as shown in Fig. 2, and as they do not rotate the irregularities or abrupt acclivities or declivities of the surface of the field in contact therewith incline the fork and cause it to conform to the plane of the surface, and when the declivity is too precipitous for such ordinary work it may, by ordinary means, be readily adjusted to an angle more or less acute, as may appear best in practice.

As the horses are hitched to the rear end of the tongue facing the rake, when they move forward they push the rake before them. When it is loaded it is pushed to the stack, and the horses then back the rake out from under the hay and leave it gathered ready to be pitched on the hay-stack. By this construction of my device the rake is less liable to catch in the ground and break the teeth, as the draft is uniformly in a straight line, and the intended purpose is in all respects more economically and thoroughly accomplished.

What I claim is—

In a horse hay-rake, the pivoted bar $d$, secured to tongue C, in combination with the fork A and roller G, substantially as shown, and for the purpose described.

SAMUEL B. GILLILAND.

Witnesses:
JOHN E. KIRK,
H. H. WAYLAND.